(12) United States Patent
Kimura et al.

(10) Patent No.: US 6,286,905 B1
(45) Date of Patent: Sep. 11, 2001

(54) CUTTING DEVICE WITH VERTICAL AND HORIZONTAL MOVEMENT

(75) Inventors: Keiji Kimura; Akifumi Hoshino, both of Yokohama; Taku Murakami, Yamato; Masaru Uenoyama, Ayase; Kiyoshi Fukasawa, Funabashi, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/254,100

(22) PCT Filed: Aug. 28, 1997

(86) PCT No.: PCT/JP97/03008

§ 371 Date: Mar. 1, 1999

§ 102(e) Date: Mar. 1, 1999

(87) PCT Pub. No.: WO98/09041

PCT Pub. Date: Mar. 5, 1998

(30) Foreign Application Priority Data

Aug. 30, 1996  (JP) .................................................. 8-246822

(51) Int. Cl.[7] .............................. E01C 23/09; B28D 1/04
(52) U.S. Cl. .................. 299/39.3; 125/13.01; 125/13.03
(58) Field of Search .................................. 299/36.1, 38.1, 299/39.3, 34.01, 35, 63, 82.1, 39.1, 73, 75; 83/816, 818, 819, 820; 30/385, 386; 125/13.01, 13.03

(56) References Cited

U.S. PATENT DOCUMENTS

| | | | | |
|---|---|---|---|---|
| 2,502,043 | * | 3/1950 | Howard | 299/39.3 |
| 3,540,334 | * | 11/1970 | McLauchaln | 83/13 |
| 4,134,459 | * | 1/1979 | Hotchen | 299/39.3 X |
| 4,232,580 | * | 11/1980 | Stewart | 83/835 |
| 4,625,781 | * | 12/1986 | Miller et al. | 30/385 X |
| 4,832,412 | * | 5/1989 | Bertrand | 299/39.3 |
| 5,174,029 | * | 12/1992 | Talberg | 30/386 |
| 5,676,125 | * | 10/1997 | Kelly et al. | 125/13.03 |

FOREIGN PATENT DOCUMENTS

| | | |
|---|---|---|
| 59-146462 | 3/1983 | (JP) . |
| 7-100979 | 2/1987 | (JP) . |
| 5 24502 | 1/1988 | (JP) . |
| 7-13376 | 2/1995 | (JP) . |

* cited by examiner

*Primary Examiner*—David Bagnell
*Assistant Examiner*—Sunil Singh
(74) *Attorney, Agent, or Firm*—Sidley Austin Brown & Wood

(57) ABSTRACT

A cutting device for performing a cutting operation, which can reduce wasteful cutting, can easily perform an accurate and neat cutting, and can have a long service life. The cutting device includes a guide supporting member, mounted to a distal end of a working machine on a self-propelled working vehicle in such a manner as to be freely swingable; a guide element, horizontally supported by the guide supporting member; a cutter, mounted to the guide element; a first movement device, for moving the cutter with respect to the guide element; and a second movement device, for moving the cutter in a direction along the guide element. A vibration preventing system can be included. Since the cutter vertically moves at a time of entering, a cutting can be efficiently performed with no wasteful cutting; and since vibration is reduced, the service life is extended.

26 Claims, 17 Drawing Sheets

F I G. 13
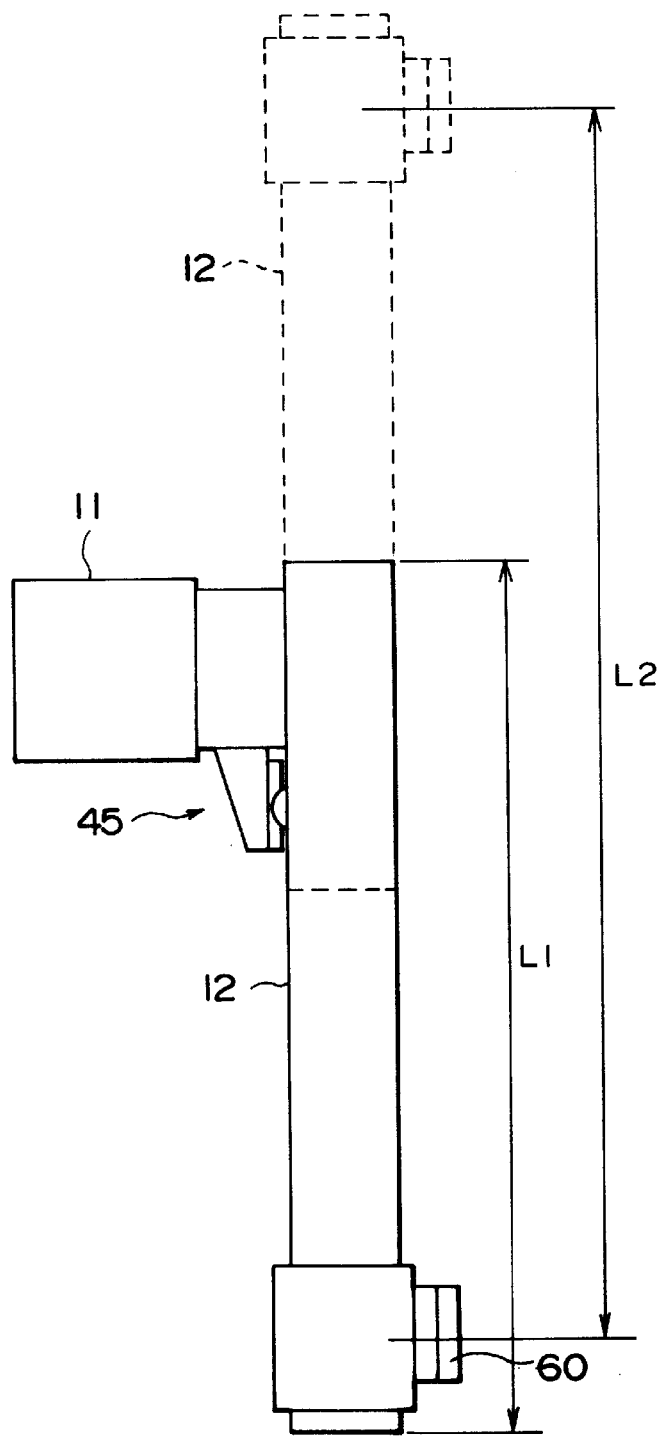

F I G. 20
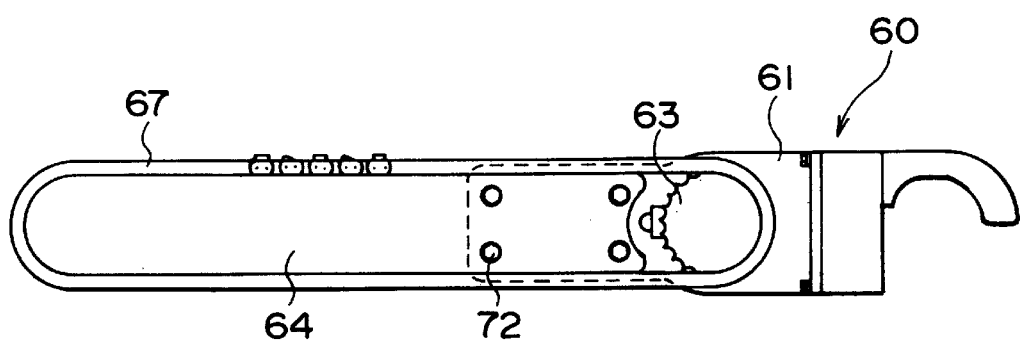
F I G. 21
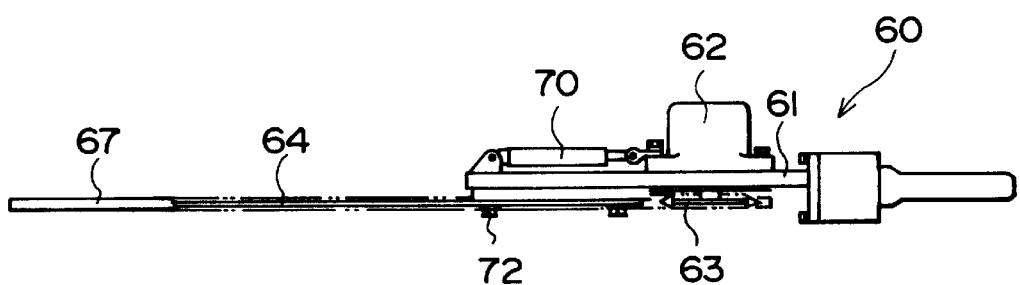

CUTTING DEVICE WITH VERTICAL AND HORIZONTAL MOVEMENT

TECHNICAL FIELD

The present invention relates to a cutting device, which is attachable to the front end of a working machine mounted on a hydraulic excavator or the like, and which is preferably used for cutting a concrete building, a road pavement, or the like.

BACKGROUND ART

Cutters are employed for pulling down a concrete building and for cutting an opening in a floor or a wall surface for reforming a building; and most of them are hand held cutters. However, there is a problem in that a cutting operation with a hand held cutter is heavy labor, so that the efficiency of the operation is low, and also it is hard to cut a high portion.

Then, in order to improve the efficiency of the operation, there has been suggested a structure in which a self-propelled chain cutting device is mounted to a rail and the rail is anchored to a material to be cut so as to self-propel the chain-cutter along the rail, thereby cutting the material to be cut. The rail can be mounted to a small back hoe machine. However, there is a problem in that the operation is limited since the machine can cut only in a direction perpendicular to the back hoe machine.

In order to solve the problem mentioned above, there is suggested in Japanese Patent Publication No. 7-13376 a supporting apparatus for a wall surface excavating chain cutter, which mounts the chain cutting device to a distal end of an operating machine arm of a traveling truck in a freely swinging manner.

FIG. 30 is a side elevational view of the supporting apparatus for the wall excavating chain cutter, in which a guide rail 91 is mounted to the distal end of a operating machine arm 90 of a hydraulic excavator in such a manner as to freely swing in a horizontal direction, thereby being swingable by a hydraulic cylinder 92 for swinging. Supporting leg frames 93 and 93 are provided at a lower side of both ends of the guide rail 91, and supporting leg shoes 94 and 94 are provided on a distal end of each of the supporting leg frames 93 and 93 in such a manner as to freely adjust the height thereof. A chain cutter 95, structured such as to be freely tilted upwardly and downwardly by a tilting hydraulic cylinder 96, is mounted to the guide rail 91. The chain cutter 95 is structured such as to be capable of being moved in a horizontal direction along the guide rail 91 by a hydraulic cylinder 97 for horizontal traveling.

When cutting a floor surface, as shown in FIG. 30, the supporting leg shoes 94 and 94 are brought into contact with the floor surface. Next, the chain cutter 95 is tilted downwardly from a position X, shown by a narrow two dot chain line, to a position, shown by a solid line, by the tilting hydraulic cylinder 96 so as to cut the floor to a depth of H. Next, the chain cutter 95 is horizontally moved along the guide rail 91 by the horizontal movement hydraulic cylinder 97 so as to excavate, as shown by a narrow two dot chain line Y.

Since the supporting apparatus is mounted to the distal end of the working machine arm 90 of the hydraulic excavator, it is possible to excavate not only the floor but also a wall; further, it is possible to excavate in an optional direction with respect to the hydraulic excavator, and it is possible to excavate a high portion.

However, the conventional structure mentioned above has the following problems.

(1) Since the chain cutter 95 is swung downwardly at a time of starting an excavation so as to deepen the cut depth, there is generated an incomplete cut portion for a length B2 before reaching the excavation depth H. Further, there is left an incomplete cut portion for a length D at a time of completing the excavation. Accordingly, as shown in FIG. 31, for example, when cutting a regular rectangular portion (a hatched portion) having a depth H and a length A along a line, the cut length C2 along the line is obtained by the following formula.

$$C2=A+B2+D$$

Therefore, there is a lot of wasteful cutting (=B2+D), and a wide cut area is required.

(2) Since the guide rail 91 is fixed to the floor surface by the, supporting leg frames 93 and 93, the center portion thereof is floated. Accordingly, when cutting a Hume pipe or the like, it is impossible to hold the Hume pipe or the like, and it is required to independently fix the Hume pipe or the like, so that the operation is troublesome.

(3) Since it is necessary to periodically adjust a tension when the chain of the chain cutter 95 is abraded, it is troublesome. Further, since it is impossible to always maintain a proper tensile state, a cutting efficiency is deteriorated, and an abnormal abrasion is generated in the chain, a sprocket for driving the chain, a chain bar or the like, so that a deterioration of the service life thereof is caused.

(4) Since the distal end of the chain cutter 95 is vibrated due to a reaction force at a time of cutting, it is impossible to accurately and neatly cut. Further, since an abrasion and a crack of the chain bar are easily generated, and an abrasion of the chain and the driving sprocket is hard, the frequency of replacing parts is increased and a deterioration of a cutting capacity is caused.

In this case, when the load becomes high during a cutting by the chain cutter 95, there is a case that a speed of rotation of the chain cutter 95 is lowered and the chain cutter 95 sometimes stops. On the contrary, when the load becomes low, a power loss is generated unless a feeding speed of the chain cutter 95 is increased. Accordingly, it is necessary to adjust them during the operation. These adjustments have been conventionally performed in accordance with an operator determining a load state while monitoring, for example, an oil pressure gauge, and manually controlling the rotational speed and the feeding speed of the chain cutter 95. Therefore, there has been a problem in that it requires a lot of skill to operate the apparatus, and it is hard to effectively perform a cutting operation.

SUMMARY OF THE INVENTION

The present invention is made by taking the problems in the conventional arts mentioned above into consideration, and an object of the present invention is to provide a cutting device which is capable of: effectively performing a cutting operation by reducing a wasteful cutting, easily performing a cutting of a Hume pipe or the like, performing an accurate and neat cutting, having a reduced abnormal abrasion of a cutter, and having a long service life.

In accordance with a first aspect of the present invention, there is provided a cutting device comprising:

a guide supporting member, which is mountable to a distal end of a working machine on a self-propelled working vehicle in such a manner as to freely swing;

guiding means, horizontally supported by the guide supporting member;

a cutter, mounted to the guiding means;

vertical movement means for moving the cutter in a direction perpendicular to the guiding means; and horizontal movement means for moving the cutter in a horizontal direction along the guide means.

In accordance with the structure mentioned above, it is possible to position the guide means at an optional position and in an optional direction, to move the cutter vertically downwardly by the vertical movement means so as to cut into a material to be cut, and to move the cutter in the horizontal direction along the guide means by the horizontal movement means so as to cut the material to be cut. Further, it is also possible to cut a wall and a high portion. Still further, since the cutter is moved in a perpendicular direction at a time of initial cutting, it is possible to efficiently cut the portion to be cut without waste. That is, a cut surface having a deep groove and a rectangular shape can be obtained, and it is possible to cut an opening in a wall.

In accordance with a second aspect of the present invention, there is provided a cutting device as cited in the first aspect, in which a lower surface of the guide supporting member projects from a lower surface of the guiding means.

Since it is possible to float the guiding means by bringing the guide supporting member into contact with the surface of the material to be cut, it is possible to horizontally place the guiding means at a predetermined position with no trouble even in a place having a slight roughness. Further, since the guide supporting member is positioned at a central portion, it is possible to firmly hold and easily cut the Hume pipe or the like.

In accordance with a third aspect of the present invention, there is provided a cutting device as cited in the second aspect, in which at least one projection, to be inserted into the material to be cut, is provided on a lower surface of the guide supporting member.

It is possible to securely fix the cutting device to a predetermined place by this projection.

In accordance with a fourth aspect of the present invention, there is provided a cutting device as cited in the second aspect, in which the guide supporting member is provided with sliding means for sliding the guiding means along a longitudinal direction of the guiding means.

It is possible to cut for a long distance by using both the sliding means and the horizontal movement means, even when the guiding means itself is short. That is, the cutting device becomes compact and is advantageous for using in a narrow place.

In accordance with a fifth aspect of the present invention, there is provided a cutting device as cited in the first aspect, in which the cutter is a chain cutter or a belt cutter structured such that a chain or a belt is wound around a bar and is provided with automatic tension adjusting means for automatically increasing the tension of the chain or the belt.

Accordingly, it is possible to adjust the tension in correspondence to an abrasion of the chain or the belt, so that it is possible to always work in a properly tensioned state. Therefore, it is possible to improve the working efficiency and to reduce an abrasion of each of the members.

In accordance with a sixth aspect of the present invention, there is provided a cutting device as cited in the fifth aspect, in which the automatic tension adjusting means automatically increases the tension of the chain or the belt when the chain or the belt stops and holds the tensioned state thereof when the chain or the belt is rotating.

Accordingly, a resistance to rotation of the chain or the belt is reduced, and an efficiency of a cutting operation can be further improved.

In accordance with a seventh aspect of the present invention, there is provided a cutting device as cited in the fifth aspect, in which the automatic tension adjusting means fixes the bar to a main body base of the cutter and makes a position of a drive portion of the chain or the belt to be movable, thereby automatically increasing the tension of the chain or the belt.

As mentioned above, since the bar is fixed to the main body base of the cutter, the chain or the belt can be held in the tensioned state against an entering force applied in an operation entering the material to be cut, so that the efficiency of the entering operation can be improved.

In accordance with an eighth aspect of the present invention, there is provided a cutting device as cited in the first aspect, in which the cutter is a chain cutter or a belt cutter, structured such that a chain or a belt is wound around a bar, and a bracket of the guiding means is provided with vibration preventing means for restricting vibration of the bar.

Accordingly, it is possible to restrict the vibration of the chain cutter or the belt cutter due to a reaction force of the cutting and the like, so that it is possible to accurately and neatly cut. Further, since an abrasion of the chain or the belt, a sprocket or a wheel for driving the same, a bar, or the like is reduced, the frequency for replacing the parts is reduced and an efficiency of work is improved.

In accordance with a ninth aspect of the present invention, there is provided a cutting device as cited in the eighth aspect, in which the vibration preventing means has vertical position adjusting means for freely moving the vibration preventing means in a vertical direction and for fixing the same.

Even when the surface to be cut is higher or lower than a lower surface of the guide supporting member, it is possible to secure a vibration prevention of the chain cutter or the belt cutter at a proper position by vertically moving the vibration preventing means. Accordingly, it is possible to obtain the same effect as that of the eighth embodiment without any relationship to the height of the surface of the material to be cut.

BRIEF DESCRIPTION OF THE DRAWINGS

FIG. 13 is a view explaining a sliding range of FIG. 11;

FIG. 20 is a front elevational view of a second version of the tension adjusting means for the chain or the belt;

FIG. 21 is a side elevational view of FIG. 20;

BEST MODE FOR CARRYING OUT THE INVENTION

Preferred embodiments of a cutting device in accordance with of the present invention will be described in detail below with reference to FIGS. 1 to 28.

Figure 1:
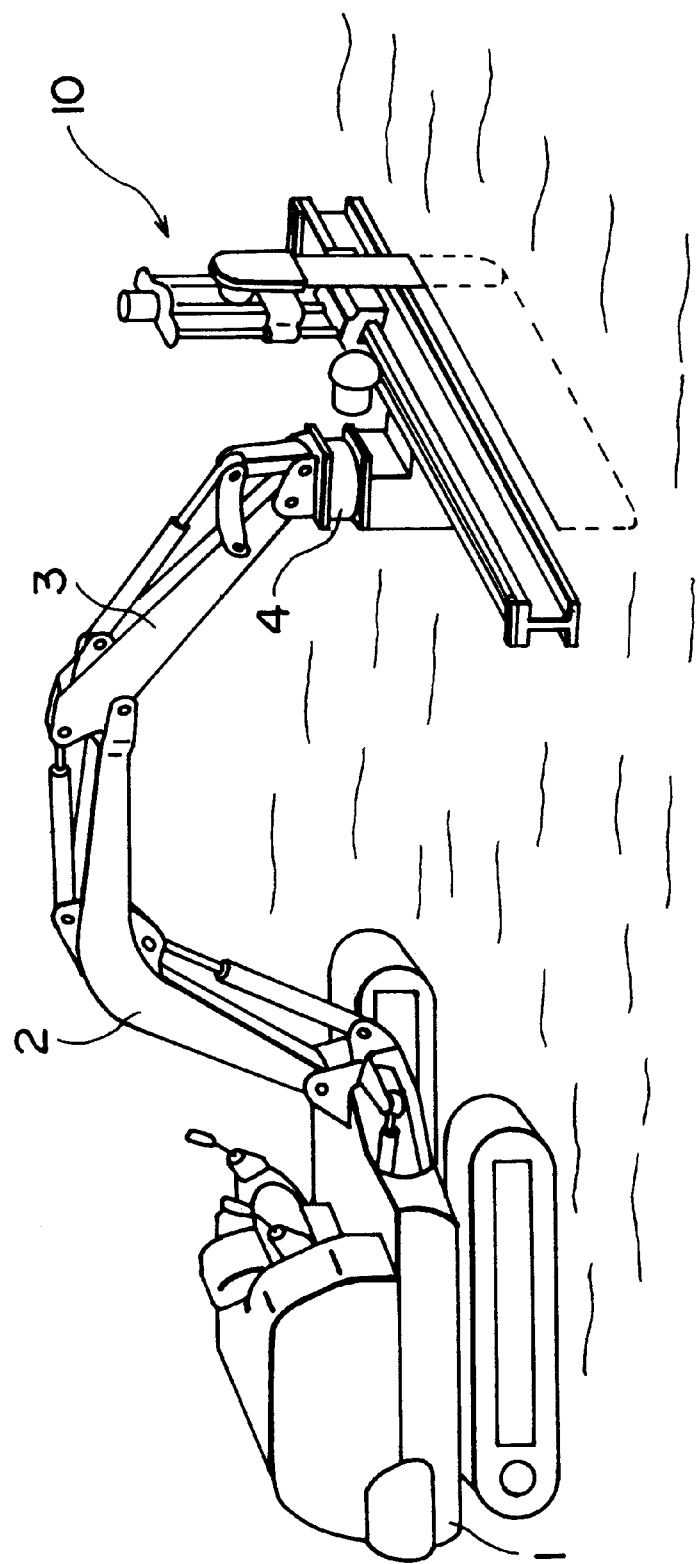
FIG. 1 is a perspective view of a hydraulic excavator to which a cutting device, in accordance with the present invention, is mounted.

FIG. 1 is a perspective view of a hydraulic excavator 1 being mounted thereon a cutting device 10 in accordance with the present invention. The cutting device 10 is mounted to the distal end of an arm 3 of a working machine 2 via a swinging apparatus 4 in such a manner as to be freely swingable.

Figure 2:
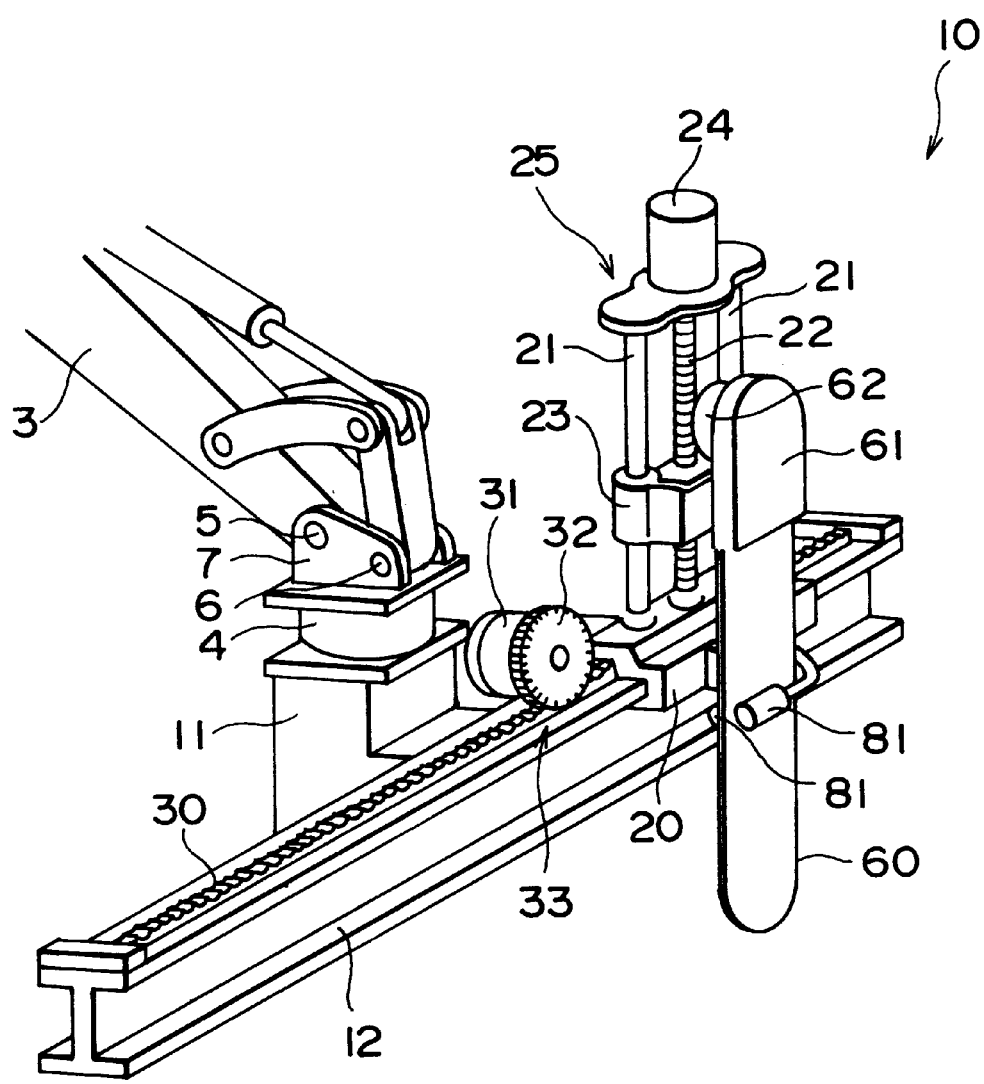
FIG. 2 is an enlarged perspective view of the cutting device in accordance with a first embodiment.

FIG. 2 is a perspective view of a first embodiment of the cutting device 10. A first bracket 7 is pivotally mounted to the distal end of the arm 3 by pivot pins 5 and 6, and a guide supporting member 11 is mounted to the first bracket 7 via the swinging apparatus 4 in such a manner as to be freely swingable. A guide rail 12 (guiding means 12) is horizontally fixed to the guide supporting member 11. A second bracket 20 is engaged with an upper portion of the guide rail 12 in such a manner as to be moveable along a longitudinal direction of the guide rail 12. A lower end of each of two standing guide rods 21 and 21 is fixed to the second bracket 20.

The cutter 60 is a disc cutter, a chain cutter, a belt cutter, or the like; and a third bracket 23 is fixed to a main body base 61 of the cutter 60. The third bracket 23 has guide holes, through which the guide rods 21 and 21 extend, and a female screw hole, which the feeding screw 22 meshes with and extends through. An upper end of the feeding screw 22 is connected to the rotational shaft of a vertical movement hydraulic motor 24 for freely moving the cutter 60 in a vertical direction. In contrast, an upper end of each of the guide rods 21 and 21 is fixed to a supporting member of the vertical movement hydraulic motor 24. When the vertical movement hydraulic motor 24 is driving, the feeding screw 22 rotates and the third bracket 23 is integrally guided with the cutter 60 by each of the guide rods 21 and 21 so as to move in a vertical direction. That is, they constitute vertical movement means 25 for vertically moving the cutter 60. In this case, a cutter driving hydraulic motor 62, for driving the cutter 60, is mounted to the main body base 61.

On the other hand, a rack 30 is fixed on an upper surface of the guide rail 12 and extends along the longitudinal direction of the guide rail 12. Further, a horizontal movement hydraulic motor 31 is fixed to the second bracket 20. A pinion 32 is provided on a rotational shaft of the horizontal movement hydraulic motor 31, and the pinion 32 and the rack 30 are engaged with each other, thereby constituting the horizontal movement means 33 for the cutter 60. That is, when the horizontal movement hydraulic motor 31 is driven, the pinion 32 rotates and the second bracket 20 integrally moves with the cutter 60 on the rack 30 (that is, on the guide rail 12) parallel to the longitudinal direction of the guide rail 12.

Inside and outside rollers 81 and 81, for preventing vibration of the cutter 60, are mounted to the second bracket 20 and hold the cutter 60 from opposite surfaces.

Figure 3:
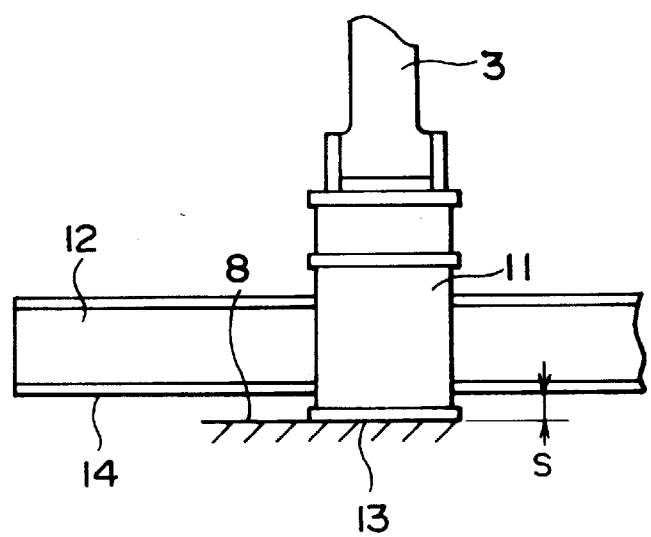
FIG. 3 is a back elevational view of a first version of a guide supporting member of the cutting device.
Figure 4:
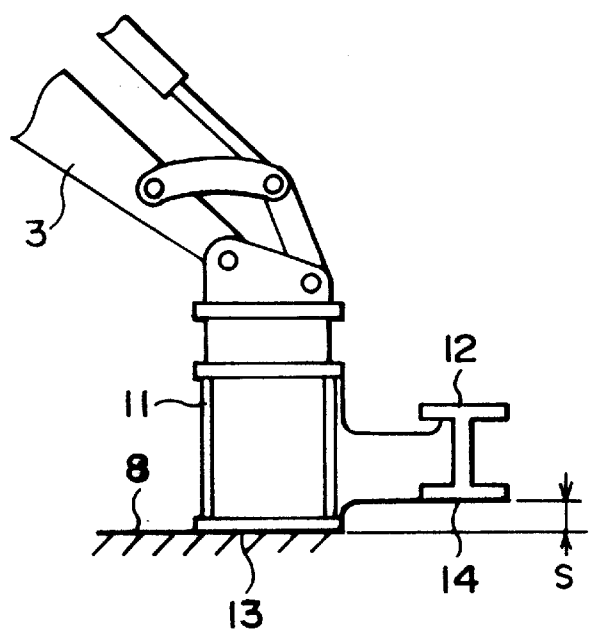
FIG. 4 is a side elevational view of the guide supporting member of FIG. 3.

FIG. 3 is a back elevational view of a first version of the guide supporting member 11, and FIG. 4 is a side elevational view of the guide supporting member 11 at FIG. 3. The guide rail 12 is fixed to the guide supporting member 11. The lower surface 13 of the guide supporting member 11 protrudes downwardly from the lower surface 14 of the guide rail 12 by a distance S, and when the lower surface 13 of the guide supporting member 11 is brought into contact with the surface of the material 8 to be cut, the lower surface 14 of the guide rail 12 is in a state at which the lower surface 14 of the guide rail 12 floats above and spaced from the surface of the material 8 to be cut. Accordingly, even when a slight roughness exists on the surface of the material 8 to be cut, it is possible to horizontally set the guide rail 12 without any trouble.

Figure 5:
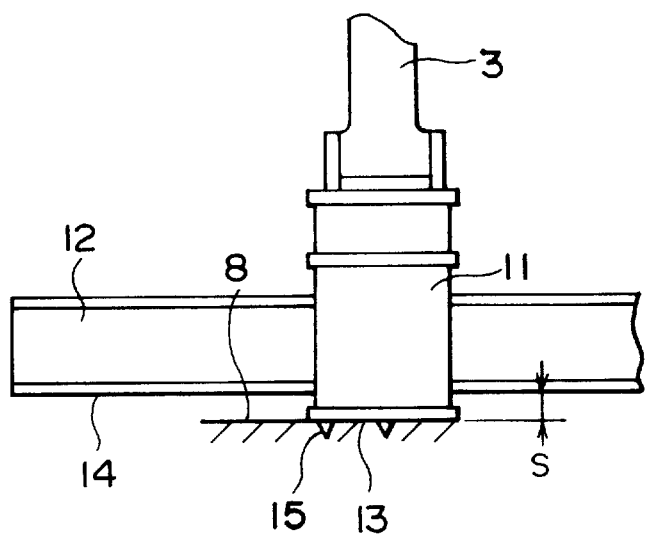
FIG. 5 is a back elevational view of a second version of a guide supporting member.
Figure 6:
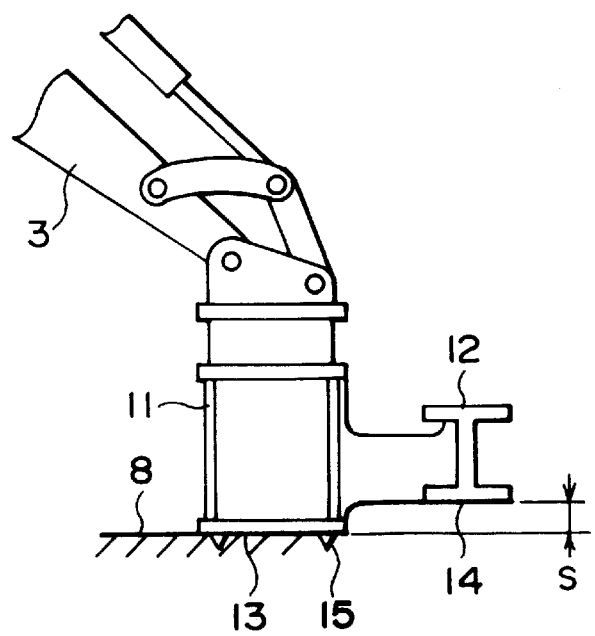
FIG. 6 is a side elevational view of the guide supporting member of FIG. 5.

FIG. 5 is a back elevational view of a second version of the guide supporting member 11, and FIG. 6 is a side elevational view of the guide supporting member 11 of FIG. 5. The lower surface 13 of the guide supporting member 11 protrudes downwardly from the lower surface 14 of the guide rail 12 for a distance S; and a plurality of projections 15 and 15 are provided on the lower surface 13 of the guide supporting member 11. When the guide supporting member 11 is brought into contact with the surface of the material 8 to be cut, each of the projections 15 and 15 enters into the material 8 to be cut so as to stabilize the guide rail 12.

Figure 7:
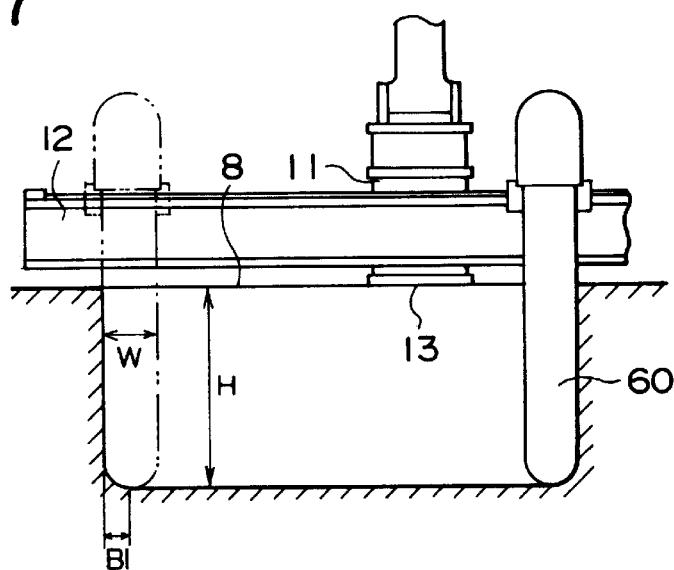
FIG. 7 is a view explaining a cutting condition by the cutting device.

When cutting the material 8 to be cut by the cutting device 10, as shown in FIG. 7, the lower surface 13 of the guide supporting member 11 is brought into contact with the surface of the material 8 to be cut so as to set the guide rail 12 to a predetermined position. Next, as shown by a narrow two dot chain line, the cutter 60 is moved downwardly by the vertical movement means 25 so as to vertically cut the material 8 to a depth H. Next, as shown in a solid line, the cutter 60 is moved in a horizontal direction by the horizontal movement means 33 so as to horizontally cut the material 8 to be cut. At this time, a length B1 of an incompletely cut portion, which does not reach the depth H at the beginning of cutting, corresponds to one half of the width W of the cutter 60, and is significantly smaller than the length B2 or D of the conventional incompletely cut portion.

Figure 8:
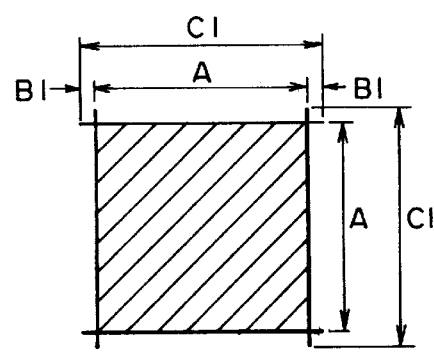
FIG. 8 is a view explaining a cutting operation for a rectangular shape.

Accordingly, a cutting length C1 along a line, when cutting a portion (a hatched portion) of a regular square having a length A as shown in FIG. 8, is expressed by the following formula:

$$C1=A+2\times B1.$$

Accordingly, the cutting length C1 is greatly smaller than the size C2 of the conventional one, so that an efficient cutting with no waste can be performed.

Figure 9:
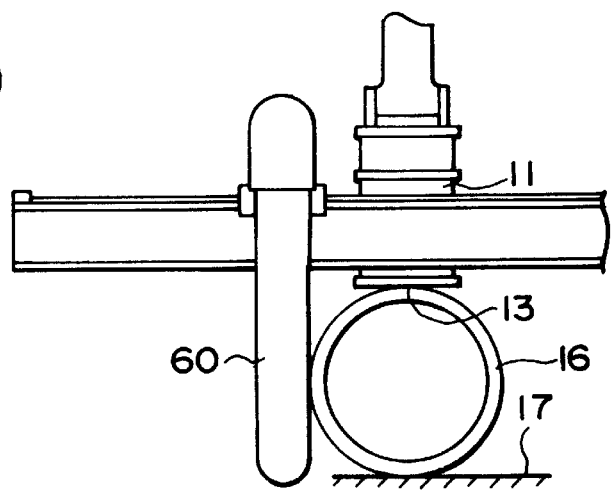
FIG. 9 is a view explaining a cutting operation for a Hume pipe.

Further, when cutting a Hume pipe or the like, as shown in FIG. 9, it is possible to use the cutter 60 to cut after pressing the Hume pipe 16 with the lower surface 13 of the guide supporting member 11 so as to fix the Hume pipe 16 against the ground surface 17, so that the work can be significantly easily performed.

In this case, when the load becomes great during a cutting by the cutter 60, the rotational speed of the cutter 60 is reduced and the cutter 60 sometimes stops. On the contrary, when the load becomes small, a power loss is generated unless the feeding speed of the cutter 60 is increased. Accordingly, it is necessary to adjust them during a work.

Figure 10:
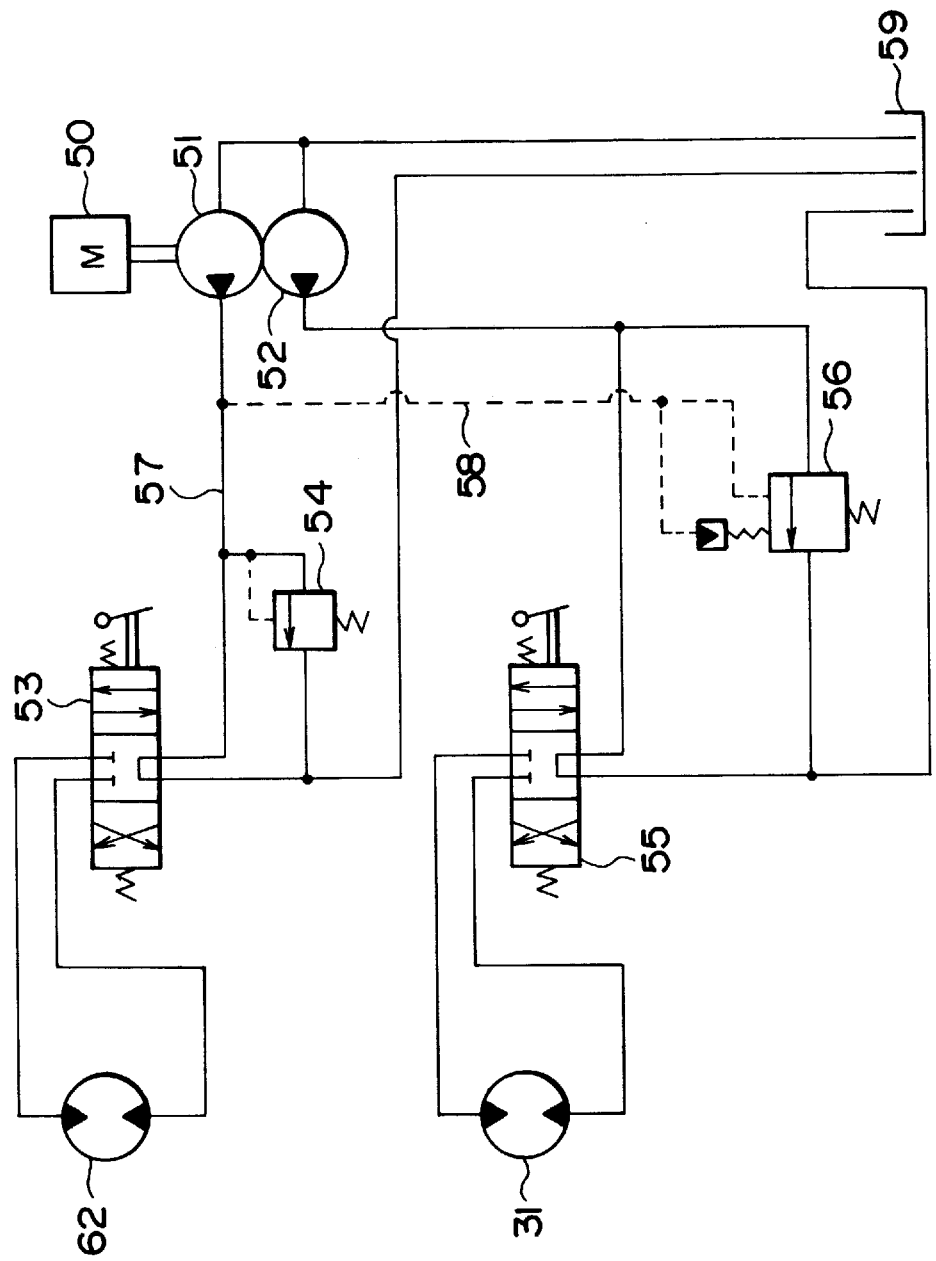
FIG. 10 is a view of a hydraulic pressure circuit in the cutting device.

Therefore, in accordance with the cutting device 10, the structure is made as follows. FIG. 10 is a hydraulic pressure circuit diagram for driving and horizontally moving the cutter 60 of the cutting device 10. A first hydraulic pump 51, for driving the cutter driving hydraulic motor 62, and a second hydraulic pump 52, for driving the horizontal movement hydraulic motor 31, are connected in series to an engine 50. The first hydraulic pump 51 and the cutter driving hydraulic motor 62 are connected to each other via a first operation valve 53, and a relief valve 54 is interposed on the circuit. The second hydraulic pump 52 and the horizontal movement hydraulic motor 31 are connected to each other via a second operation valve 55, and a variable relief valve 56 is interposed on the circuit. A discharge fluid conduit 57 of the first hydraulic pump 51 and the variable relief valve 56 are connected to each other via a pilot fluid conduit 58. Reference numeral 59 denotes an oil tank.

An operation of the hydraulic pressure circuit will be described. An operator operates the first operation valve 53 and the second operation valve 55 so as to drive the cutter driving hydraulic motor 62 and the horizontal movement hydraulic motor 31, thereby performing a cutting. When the load of the cutter 60 is increased, the hydraulic pressure of the discharge circuit 57 of the first hydraulic pump 51 is increased, and the rotational speed of the cutter driving hydraulic motor 62 is reduced. The variable relief valve 56 reduces a set relief pressure of the variable relief valve 56 responsive to the hydraulic pressure from the pilot circuit 58 and reduces the operation hydraulic pressure to the horizontal movement hydraulic motor 31 so as to reduce the feeding force, thereby reducing the cutting amount of the cutter. Accordingly, the load on the cutter 60 is reduced, and the rotational speed of the cutter driving hydraulic motor 62 is increased.

In this case, when the rotational speed of the cutter driving hydraulic motor 62 is increased, the hydraulic pressure of the discharge circuit 57 of the first hydraulic pump 51 is reduced. The variable relief valve 56 increases the set relief pressure responsive to the low hydraulic pressure from the pilot circuit 58, and increases the operation hydraulic pressure to the horizontal movement hydraulic motor 31 so as to increase the feeding force, thereby increasing the cutting amount. Accordingly, the load on the cutter 60 is increased, and the rotational speed of the cutter driving hydraulic motor 62 is reduced.

That is, since the rotational speed of the cutter 60 maintains a set optimum value without any relation to a change in the load and feeding is always performed by a proper pressing force, it is possible to efficiently cut. Further, since the adjustment is automatically performed, the work can be efficiently performed without regard to the skill of the operator.

Next, a second embodiment of the cutting device 10 will be described below with reference to FIGS. 11 and 12.

Figure 11:
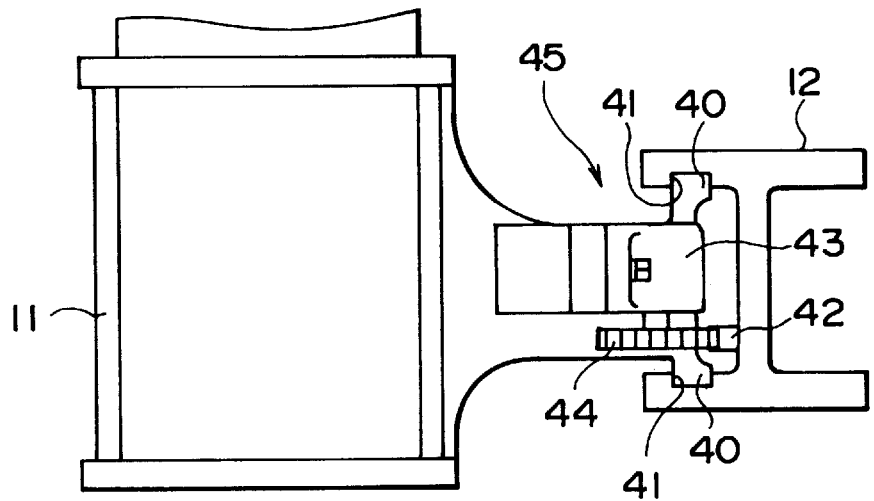
FIG. 11 is a side elevational view of the sliding means of a second embodiment of the cutting device.
Figure 12:
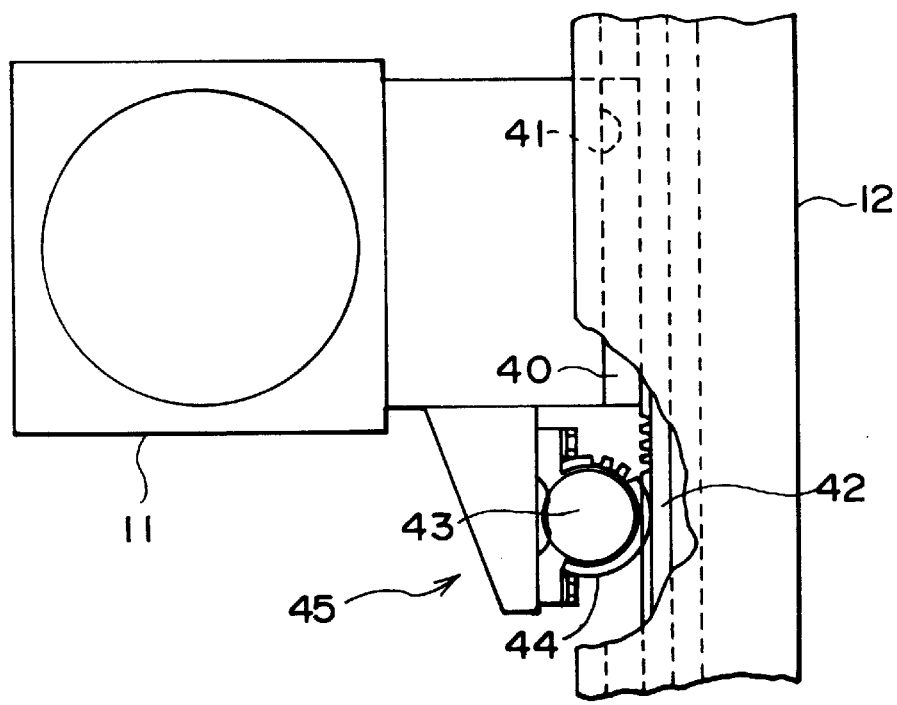
FIG. 12 is a plan view of the sliding means of FIG. 11.

FIG. 11 is a side elevational view of the guide supporting member 11, having sliding means 45; and FIG. 12 is a plan view of the guide supporting member 11 and sliding means 45 of FIG. 11. Guiding portions 40 and 40, each formed in a projection shape, are respectively provided in upper and lower portions of the guide supporting member 11. Each of the guiding portions 40 and 40 is engaged with a respective one of the longitudinally extending grooves 41 and 41, which are provided inside the upper and lower portions of the guide rail 12. A rack 42 for sliding is fixed to the guide rail 12 parallel to the longitudinal length of the guide rail 12. Further, a hydraulic motor 43 for sliding is fixed to the guide supporting member 11, and a pinion 44 is provided around a rotational shaft thereof. The pinion 44 is engaged with the sliding rack 42 so as to constitute the sliding means 45. Accordingly, the guide rail 12 is structured such as to move along the guiding portion 40 in a lateral direction with respect to the guide supporting member 11.

That is, when the sliding hydraulic motor 43 is driven, the pinion 44 rotates and the guide rail 12 moves from the solid line position to a dot line position shown in FIG. 13. Accordingly, it is possible to move the cutter 60 for a longer distance L2, even in the case of the guide rail 12 having a short length L1, by also using the horizontal movement means 33. Therefore, the cutting device 10 can be made compact, and work in a narrow place can be easily performed.

Next, a chain tension adjusting means, in the case that the cutter 60 is a chain cutter, will be described below.

Figure 14:
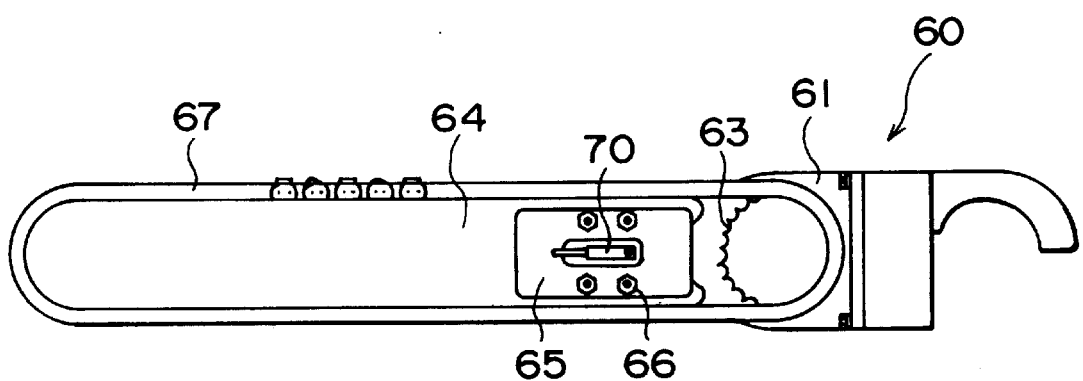
FIG. 14 is a front elevational view of a first version of a tension adjusting means for a chain or a belt of the cutting device.
Figure 15:
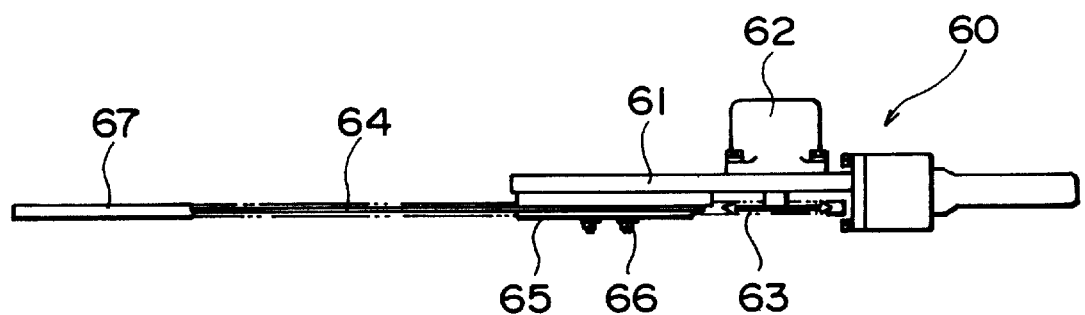
FIG. 15 is a side elevational view of the tension adjusting means of FIG. 14.

FIG. 14 is a front elevational view of a first version of the chain tension adjusting means, and FIG. 15 is a side elevational view of the chain tension adjusting means of FIG. 14. A hydraulic motor 62, for driving the cutter, is mounted to a main body base 61, and a sprocket 63 is mounted to the rotational shaft of the cutter driving hydraulic motor 62. A bar 64 is held in a distal end portion of the main body base 61 via a plate 65 and a plurality of insert bolts 66 in such a manner as to be moveable in a longitudinal direction of the cutter 60. A chain 67 is wound around a periphery of the sprocket 63 and the bar 64. A tensioning hydraulic cylinder 70 is positioned in a center portion of the plate 65.

Figure 16:
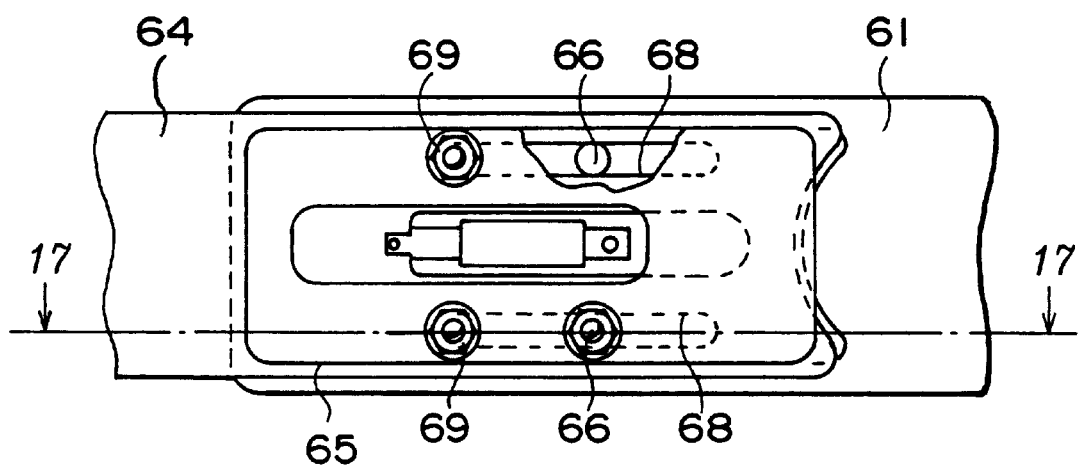
FIG. 16 is an enlarged front elevational view of a bar holding portion of the tension adjusting means of FIG. 14.
Figure 17:
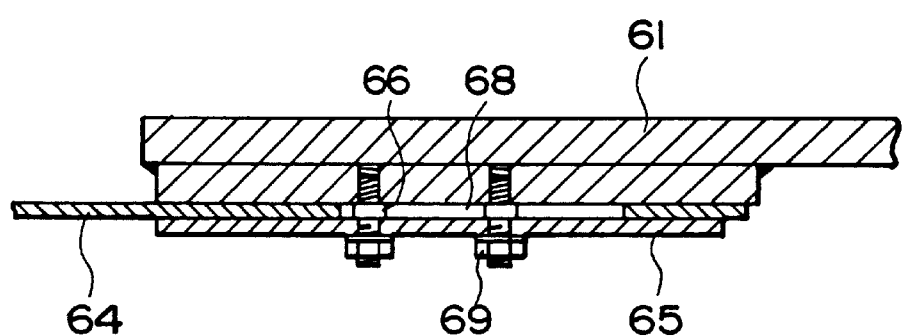
FIG. 17 is a cross sectional view of FIG. 16.

FIG. 16 is a front elevational view of a cross section of a part of the held portion of the bar 64, and FIG. 17 is a cross sectional view along the line 17—17 in FIG. 16. Two oblong guiding holes 68 and 68 are provided at a right end of the bar 64 in the drawing and extend in a longitudinal direction, and two insert bolts 66 and 66, which are fixed to the main body base 61, engage the guiding oblong holes 68 and 68 respectively. Accordingly, the bar 64 can move relative to the main body base 61 parallel to the longitudinal direction of the cutter. The plate 65 is fastened to the distal ends of the two insert bolts 66 and 66 by two nuts 69 and 69, respectively. Accordingly, it is possible to adjust the tension of the chain 67 by fastening the two nuts 69 and 69 after expanding or contracting the bar 64 and nipping the bar 64 between the plate 65 and the main body base 61.

Figure 18:
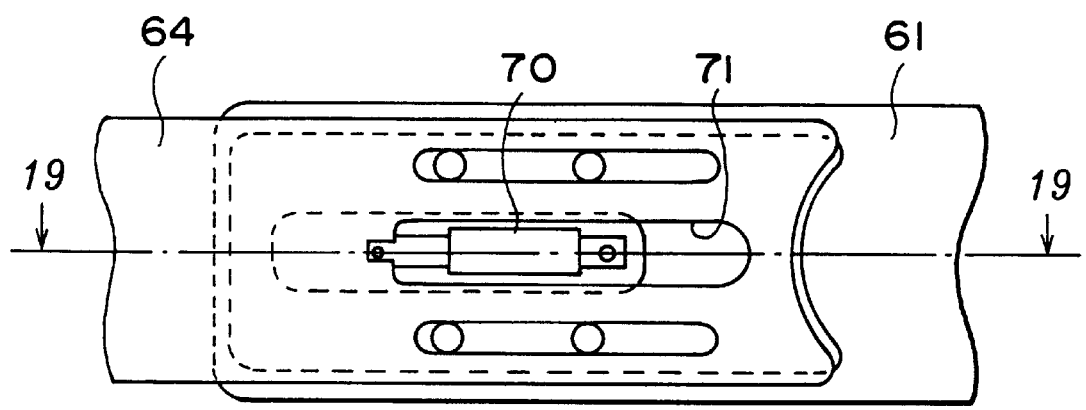
FIG. 18 is an enlarged front elevational view of a tension hydraulic cylinder portion of the tension adjusting means of FIG. 14.
Figure 19:
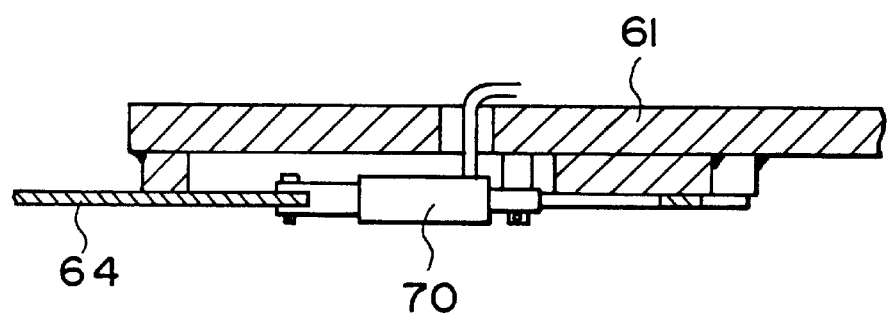
FIG. 19 is a cross sectional view of FIG. 18.

FIG. 18 is a front elevational view with the plate 65 and two nuts 69 and 69 removed, and FIG. 19 is a cross sectional view along the line 19—19 in FIG. 18. One end of the tension hydraulic cylinder 70 is connected to the main body base 61, and the other end is connected to an end portion of the bar 64. Accordingly, when the tension hydraulic cylinder 70 is expanded, the tension of the chain 67 is increased.

FIG. 20 is a front elevational view of a second version of the chain tension adjusting means, and FIG. 21 is a side elevational view of the chain tension adjusting means of FIG. 20. One end of the tension hydraulic cylinder 70 is connected to the main body base 61, and the other end thereof is connected to a case of the cutter driving hydraulic motor 62. The bar 64 is fixed to an end portion of the main body base 61 by a plurality of bolts 72. The chain 67 is wound around the outer periphery of the sprocket 63 and the bar 64 and is mounted to the cutter driving hydraulic motor 62.

Figure 22:
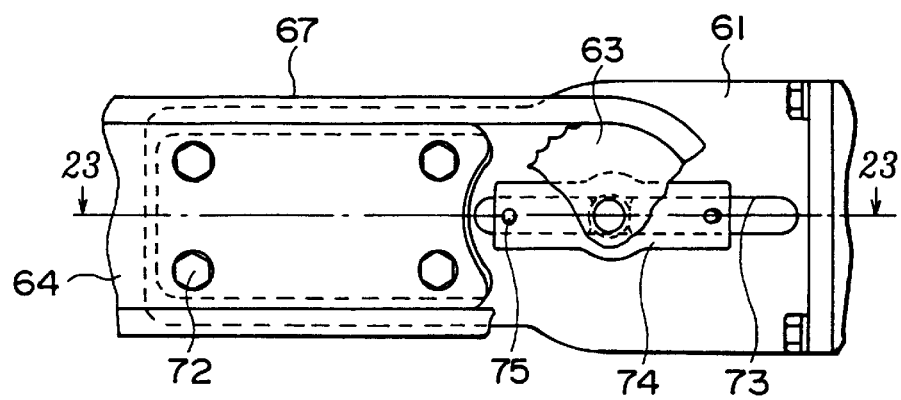
FIG. 22 is an enlarged front elevational view of a portion of FIG. 20 for mounting a hydraulic motor for driving the chain or the belt.
Figure 23:
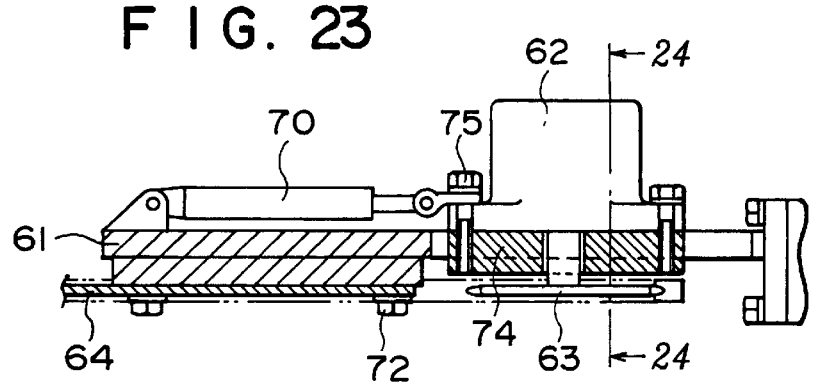
FIG. 23 is a cross sectional view of FIG. 22.
Figure 24:
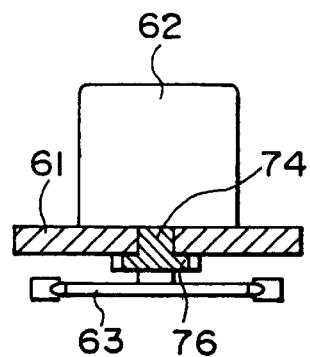
FIG. 24 is a cross sectional view of a rear portion of FIG. 23.

FIG. 22 is a front elevational view of a mounting portion for the cutter driving hydraulic motor 62, FIG. 23 is a cross sectional view along the line 23—23 in FIG. 22, and FIG. 24 is a cross sectional view along the line 24—24 in FIG. 23. An oblong guide hole 73 is provided in the main body base 61. A slide plate 74, fastened with one surface beside the sprocket 63 by a plurality of bolts 75 and 75, is inserted within the oblong guide hole 73. A flange 76, which is formed on the slide plate 74 as shown in FIG. 24, movably supports the cutter driving hydraulic motor 62 and the sprocket 63 corresponding to the driving portion. Accordingly, the driving portion is moved by expanding the tension hydraulic cylinder 70, so that the tension of the chain 67 is increased.

As mentioned above, since the bar 64 is fixed and only the driving portion moves so as to increase the tension of the chain 67, it is possible to hold the chain 67 in a tensioned state against an entering force even in an operation for entering the material to be cut.

Figure 25:
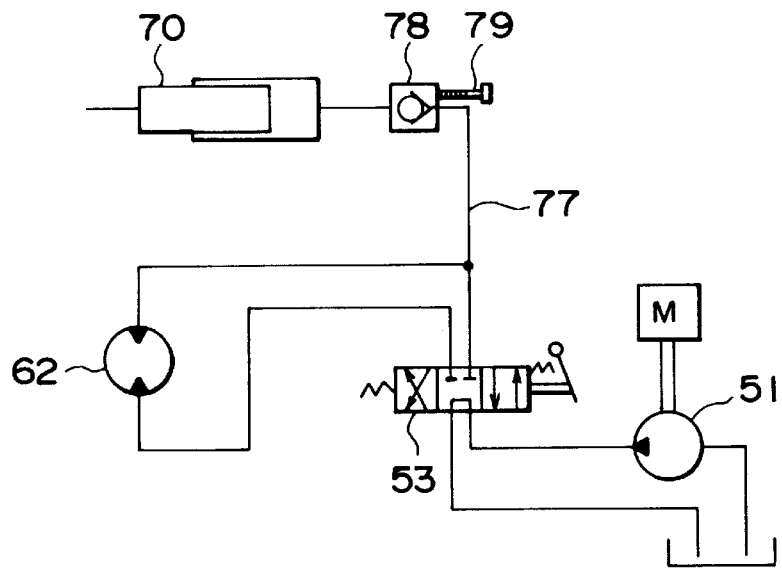
FIG. 25 is a first version of a hydraulic pressure circuit diagram of a tension adjusting means for the chain or the belt.

A version of a hydraulic pressure circuit of the chain tension adjusting means is shown in FIG. 25. For example, in the driving circuit of the chain cutter 60 comprising the first hydraulic pump 51, the first operation valve 53 and the cutter driving hydraulic motor 62 shown in FIG. 10, a bypass fluid conduit 77 is provided in the drive circuit and is connected to an expansion side of the tension hydraulic cylinder 70. A one-way valve 78 is interposed in the bypass fluid conduit 77, and a screw 79, for opening the one-way valve 78, is additionally provided in the one-way valve 78.

When starting a cutting operation with this hydraulic pressure circuit, a hydraulic pressure is generated in the bypass fluid conduit 77 and the pressurized fluid is fed to the tensioning hydraulic cylinder 70 via the one-way valve 78. Then, the tensioning hydraulic cylinder 70 expands and automatically increases the tension of the chain 67. On the other hand, when the hydraulic pressure is reduced during a cutting operation, the tension hydraulic cylinder 70 is not shortened, due to the existence of the one-way valve 78, so that the chain 67 is not loosened. Accordingly, even when the chain 67 is abraded and expanded during an operation, an operation is always performed in a properly tensioned state, an abnormal abrasion is not generated, and there is no fear of a reduction of the cutting efficiency. In this case, when replacing the chain 67, the one-way valve 78 can be opened by the screw 79 so as to shorten the tensioning hydraulic cylinder 70, thereby facilitating the replacing of the chain 67.

Figure 26:
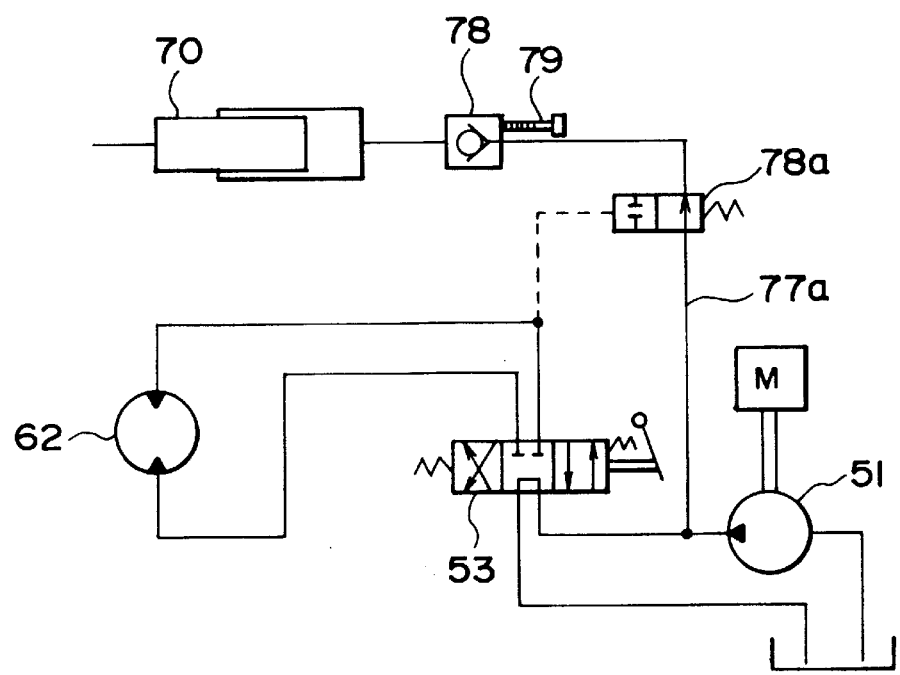
FIG. 26 is a modified version of the hydraulic pressure circuit diagram of FIG. 25.

Further, another version of a hydraulic pressure circuit of the chain tension adjusting means is shown in FIG. 26. In place of the bypass fluid conduit 77 in FIG. 25, a bypass fluid conduit 77a is provided between the first hydraulic pump 51 and the first operation valve 53 and is connected to an expansion side of the tensioning hydraulic cylinder 70. The one-way valve 78 and a pilot switching valve 78a are interposed in the bypass fluid conduit 77a, and the pilot fluid conduit of the driving circuit is connected to the pilot switching valve 78a.

In this hydraulic pressure circuit, before the cutting operation is started, that is, when the chain 67 is stopped, the pilot switching valve 78a is in an open state, so that the pressurized fluid in the first hydraulic pump 51 is fed to the tensioning hydraulic cylinder 70 via the one-way valve 78. Then, the tension hydraulic cylinder 70 expands so as to increase the tension of the chain 67. Further, during the cutting operation, that is, when the chain 67 is rotating, since the hydraulic pressure is generated in the pilot fluid conduit and the pilot type switching valve 78a is changed to its closed state, the tensioning hydraulic cylinder 70 is not expanded, so as to hold the chain 67 in an original state. Accordingly, the rotational resistance of the chain 67 is reduced, and the efficiency of the cutting operation is further improved.

Next, a vibration preventing apparatus corresponding to vibration preventing means for the cutter 60 will be described below.

Figure 27:
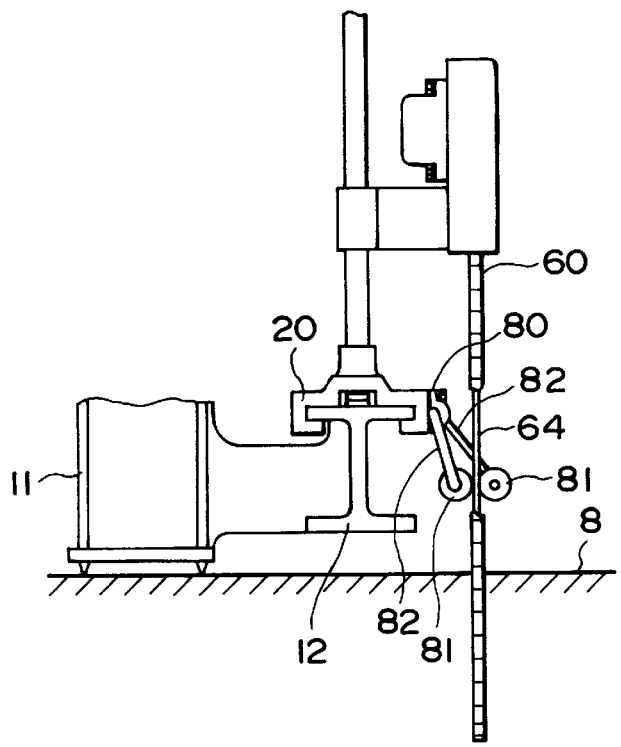
FIG. 27 is a side elevational view of a first version of a vibration preventing apparatus for the cutting device.

FIG. 27 is a side elevational view of a first version of the cutter vibration preventing apparatus. A bracket 80 is detachably fixed by a bolt to a front surface of the second bracket 20, which is structured such as to be engaged with the guide rail 12 so as to freely move in a horizontal direction. Torsion bars 82 and 82, having a pair of opposing rollers 81 and 81, are mounted at both distal ends of the bracket 80. Thus, each of the rollers 81 and 81 holds the bar 64 at a proper position from opposite surfaces of the bar 64.

Each of the rollers 81 and 81 is positioned near the surface of the material 8 to be cut so as to prevent the bar 64 from vibrating due to the cutting resistance. Accordingly, it is possible to reduce an abrasion and the generation of a crack in the bar 64 and an abrasion in the chain 67 and the sprocket 63. Further, it is possible to obtain a neat and accurate cutting surface which is preferable for a construction, such as a reforming and the like, in which an accuracy is required; and further, a cutting efficiency can be improved.

Figure 28:
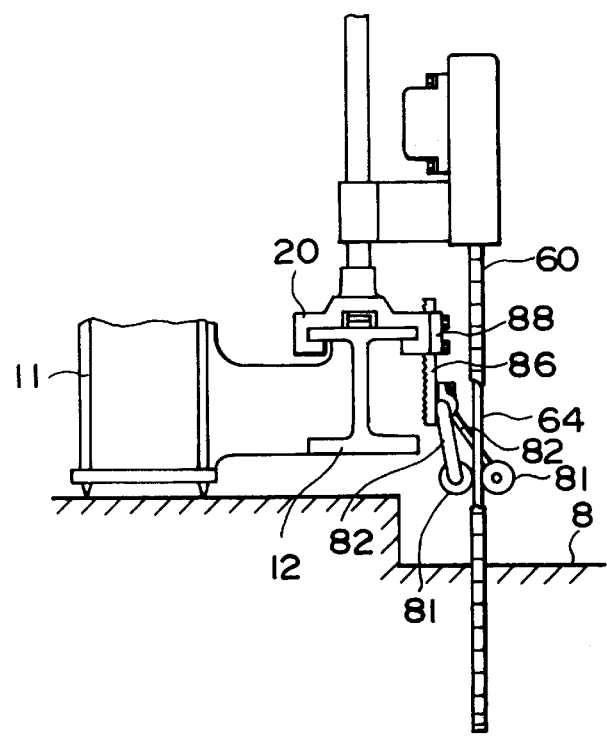
FIG. 28 is a side elevational view of a second version of a vibration preventing apparatus.
Figure 29:
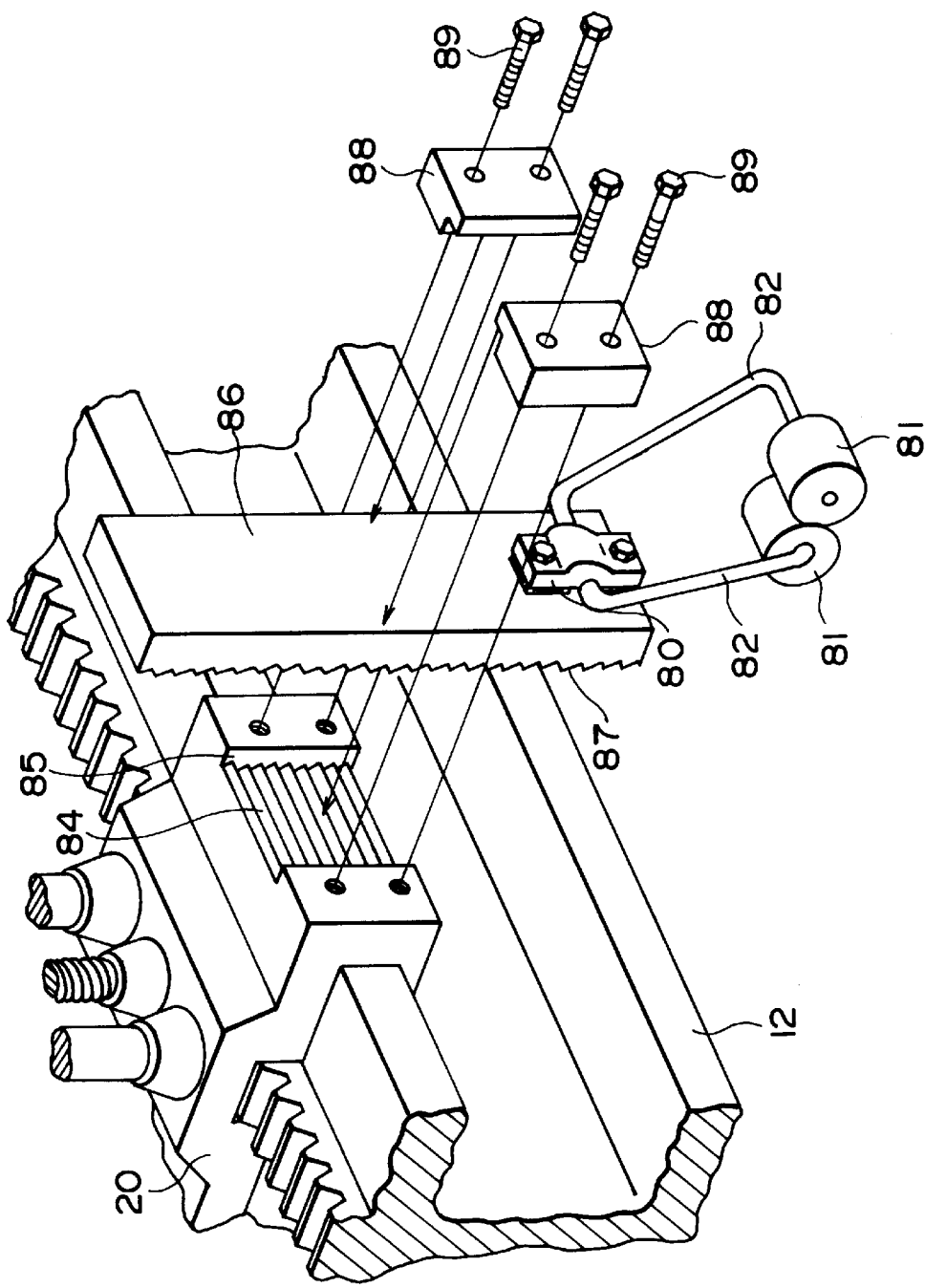
FIG. 29 is an exploded perspective view showing the structure of parts of FIG. 28.
Figure 30:
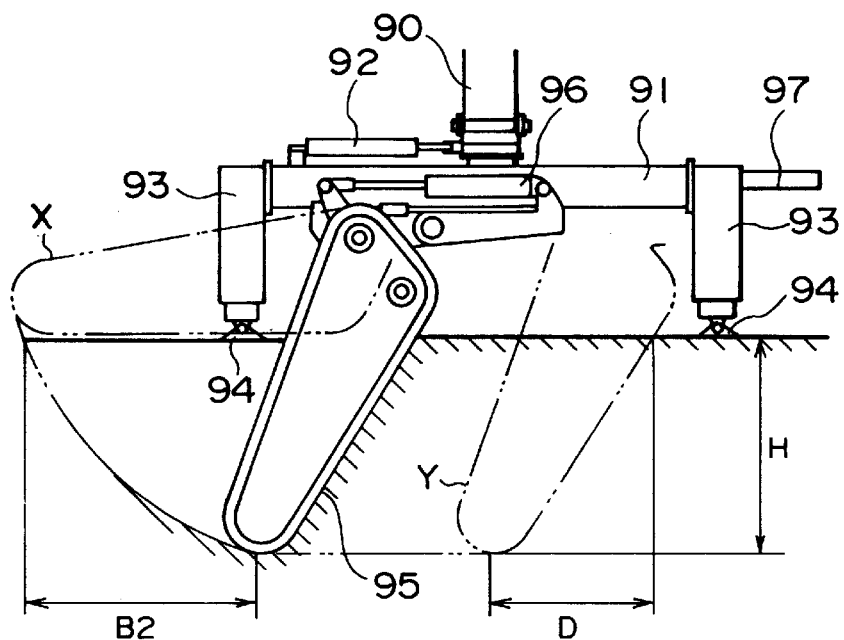
FIG. 30 is a front elevational view of a conventional cutting device.
Figure 31:
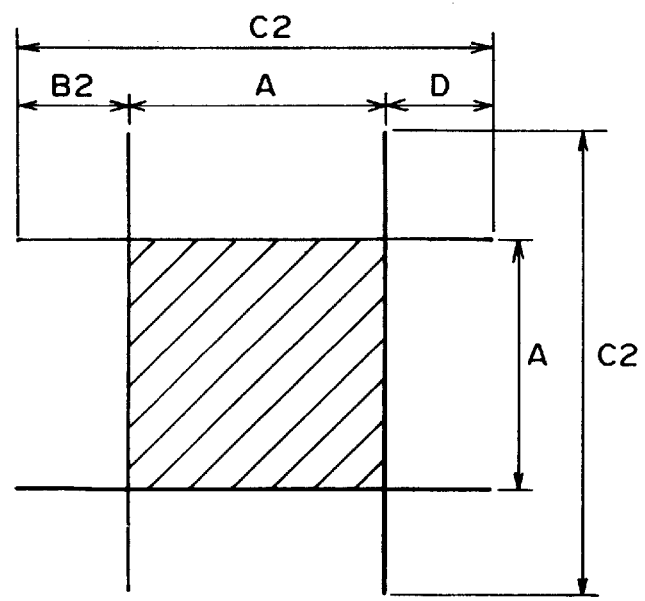
FIG. 31 is a view explaining a cutting operation for a rectangular shape.

FIG. 28 is a side elevational view of a second version of the vibration preventing apparatus for the cutter 60, and FIG. 29 is a perspective view showing a structure of parts thereof. A groove 85 having vertical teeth 84 on a back surface, is provided in a front surface of the second bracket 20. The bracket 80 is provided on a front surface of a lower end of a second slide plate 86. The second slide plate 86 has vertical teeth 87 on an opposite surface of the bracket 80, and it is structured such that the teeth 87 and the teeth 84 are engaged with each other so as not to mutually shift. That is, after fitting the second slide plate 86 into the groove 85, the second slide plate 86 is fastened via a pair of pressing plates 88 and a plurality of pressing bolts 89.

Since the vertical position adjusting means is structured in the manner mentioned above, it is possible to adjust the position of the rollers 81 in a vertical direction by adjusting the second slide plate 86 in a vertical direction. Accordingly, even when the surface of the material 8 to be cut has a step as shown in FIG. 28, it is possible to obtain the same effect as that of the first embodiment by positioning the rollers 81 near the surface of the material 8 to be cut.

Industrial Applicability

The present invention relates to a cutting device which is capable of effectively performing a cutting operation by reducing a wasteful cutting, easily performing a cutting of a Hume pipe or the like, performing an accurate and neat cutting, having a reduced abnormal abrasion of a cutter, and having a long service life. The cutting device is mounted to a distal end of a working machine on a self-propelled working vehicle, such as a hydraulic excavator or the like, and is useful as a cutting device for cutting a concrete building, a road pavement, or the like.

What is claimed is:

1. A cutting device comprising:
   a guide supporting member, which is adapted to be mounted to a distal end of a working machine on a self-propelled working vehicle so as to be freely swingable, wherein said guide supporting member has at least one stabilizing projection on a lower surface of said guide supporting member, said at least one stabilizing projection being adapted to be inserted into a material;
   guiding means, said guiding means having a longitudinal length with an intermediate portion of said longitudinal length being supported by said guide supporting member;
   a cutter, which is mounted to said guiding means;
   first movement means, for moving said cutter in a direction which is perpendicular to said longitudinal length of said guiding means; and
   second movement means, for moving said cutter in a direction which is parallel to said longitudinal length of said guiding means.

2. A cutting device as claimed in claim 1, wherein said lower surface of said guide supporting member projects below a lower surface of said guiding means.

3. A cutting device as claimed in claim 2, wherein said cutter is a chain cutter having a chain wound around a bar, and is provided with automatic tension adjusting means for automatically increasing tension of the chain.

4. A cutting device as claimed in claim 3, wherein said automatic tension adjusting means automatically increases the tension of said chain when said chain stops and holds a tensioned state thereof when said chain is rotating.

5. A cutting device as claimed in claim 3, wherein said cutter includes a main body base and a drive means for said chain, and wherein said automatic tension adjusting means fixes said bar to said main body base and makes a position of said drive means of said chain movable in order to automatically increase the tension of the chain.

6. A cutting device as claimed in claim 2, wherein said cutter is a belt cutter having a belt wound around a bar, and is provided with automatic tension adjusting means for automatically increasing tension of the belt.

7. A cutting device as claimed in claim 6, wherein said automatic tension adjusting means automatically increases the tension of said belt when said belt stops and holds a tensioned state thereof when said belt is rotating.

8. A cutting device as claimed in claim 6, wherein said cutter includes a main body base and a drive means for said belt, and wherein said automatic tension adjusting means fixes said bar to said main body base and makes a position of said drive means of said belt movable in order to automatically increase the tension of the belt.

9. A cutting device comprising:
   a guide supporting member, which is adapted to be mounted to a distal end of a working machine on a self-propelled working vehicle so as to be freely swingable;
   guiding means, which is supported by said guide supporting member and which has a longitudinal length;
   a cutter, which is mounted to said guiding means;
   first movement means, for moving said cutter in a direction which is perpendicular to said longitudinal length of said guiding means;
   second movement means, for moving said cutter in a direction which is parallel to said longitudinal length of said guiding means;
   wherein said guide supporting member has a lower surface which projects below a lower surface of said guiding means; and
   wherein said guide supporting member is provided with sliding means for sliding said guiding means in a direction of said longitudinal length of said guiding means.

10. A cutting device comprising:
    a guide supporting member, which is adapted to be mounted to a distal end of a working machine on a self-propelled working vehicle so as to be freely swingable;
    guiding means, said guiding means having a longitudinal length with an intermediate portion of said longitudinal length being supported by said guide supporting member;
    a cutter, which is mounted to said guiding means;
    first movement means, for moving said cutter in a direction which is perpendicular to said longitudinal length of said guiding means;
    second movement means, for moving said cutter in a direction which is parallel to said longitudinal length of said guiding means;
    wherein said guide supporting member has a lower surface which projects below a lower surface of said guiding means; and
    wherein said cutter is a chain cutter having a chain wound around a bar, and wherein said guiding means is provided with vibration preventing means for restricting a vibration of the bar.

11. A cutting device as claimed in claim 10, wherein said vibration preventing means has vertical position adjusting means for freely moving the vibration preventing means in a vertical direction and for fixing the vibration preventing means to said guiding means.

12. A cutting device comprising:
    a guide supporting member, which is adapted to be mounted to a distal end of a working machine on a self-propelled working vehicle so as to be freely swingable;
    guiding means, said guiding means having a longitudinal length with an intermediate portion of said longitudinal length being supported by said guide supporting member;
    a cutter, which is mounted to said guiding means;
    first movement means, for moving said cutter in a direction which is perpendicular to said longitudinal length of said guiding means;

second movement means, for moving said cutter in a direction which is parallel to said longitudinal length of said guiding means;

wherein said guide supporting member has a lower surface which projects below a lower surface of said guiding means; and wherein said cutter is a belt cutter having a belt wound around a bar, and wherein said guiding means is provided with vibration preventing means for restricting a vibration of the bar.

13. A cutting device as claimed in claim 12, wherein said vibration preventing means has vertical position adjusting means for freely moving the vibration preventing means in a vertical direction and for fixing the vibration preventing means to said guiding means.

14. Apparatus comprising:
a self-propelled working vehicle;
a working machine mounted on said vehicle and having a distal end;
a guide supporting member, which is mounted to said distal end of said working machine so as to be freely swingable, wherein said guide supporting member has at least one stabilizing projection on a lower surface of said guide supporting member, said at least one stabilizing projection being adapted to be inserted into a material;
guiding means, said guiding means having a longitudinal length with an intermediate portion of said longitudinal length being supported by said guide supporting member;
a cutter, which is mounted to said guiding means;
first movement means, for moving said cutter in a direction which is perpendicular to said longitudinal length of said guiding means; and
second movement means, for moving said cutter in a direction which is parallel to said longitudinal length of said guiding means.

15. Apparatus as claimed in claim 14, wherein said lower surface of said guide supporting member projects below a lower surface of said guiding means.

16. Apparatus as claimed in claim 15, wherein said cutter is a chain cutter having a chain wound around a bar, and is provided with automatic tension adjusting means for automatically increasing tension of the chain.

17. Apparatus as claimed in claim 16, wherein said automatic tension adjusting means automatically increases the tension of said chain when said chain stops and holds a tensioned state thereof when said chain is rotating.

18. Apparatus as claimed in claim 16, wherein said cutter includes a main body base and a drive means for said chain, and wherein said automatic tension adjusting means fixes said bar to said main body base and makes a position of said drive means of said chain movable in order to automatically increase the tension of the chain.

19. Apparatus as claimed in claim 15, wherein said cutter is a belt cutter having a belt wound around a bar, and is provided with automatic tension adjusting means for automatically increasing tension of the belt.

20. Apparatus as claimed in claim 19, wherein said automatic tension adjusting means automatically increases the tension of said belt when said belt stops and holds a tensioned state thereof when said belt is rotating.

21. Apparatus as claimed in claim 19, wherein said cutter includes a main body base and a drive means for said belt, and wherein said automatic tension adjusting means fixes said bar to said main body base and makes a position of said drive means of said belt movable in order to automatically increase the tension of the belt.

22. Apparatus comprising:
a self-propelled working vehicle;
a working machine mounted on said vehicle and having a distal end;
a guide supporting member, which is mounted to said distal end of said working machine so as to be freely swingable;
guiding means, which is supported by said guide supporting member and which has a longitudinal length;
a cutter, which is mounted to said guiding means;
first movement means, for moving said cutter in a direction which is perpendicular to said longitudinal length of said guiding means;
second movement means, for moving said cutter in a direction which is parallel to said longitudinal length of said guiding means;
wherein said guide supporting member has a lower surface which projects below a lower surface of said guiding means; and
wherein said guide supporting member is provided with sliding means for sliding said guiding means in a direction of said longitudinal length of said guiding means.

23. Apparatus comprising:
a self-propelled working vehicle;
a working machine mounted on said vehicle and having a distal end;
a guide supporting member, which is mounted to said distal end of said working machine so as to be freely swingable;
guiding means, said guiding means having a longitudinal length with an intermediate portion of said longitudinal length being supported by said guide supporting member;
a cutter, which is mounted to said guiding means;
first movement means, for moving said cutter in a direction which is perpendicular to said longitudinal length of said guiding means;
second movement means, for moving said cutter in a direction which is parallel to said longitudinal length of said guiding means;
wherein said guide supporting member has a lower surface which projects below a lower surface of said guiding means; and
wherein said cutter is a chain cutter having a chain wound around a bar, and wherein said guiding means is provided with vibration preventing means for restricting a vibration of the bar.

24. Apparatus as claimed in claim 23, wherein said vibration preventing means has vertical position adjusting means for freely moving the vibration preventing means in a vertical direction and for fixing the vibration preventing means to said guiding means.

25. Apparatus comprising:
a self-propelled working vehicle;
a working machine mounted on said vehicle and having a distal end;
a guide supporting member, which is mounted to said distal end of said working machine so as to be freely swingable;
guiding means, said guiding means having a longitudinal length with an intermediate portion of said longitudinal length being supported by said guide supporting member;

a cutter, which is mounted to said guiding means;

first movement means, for moving said cutter in a direction which is perpendicular to said longitudinal length of said guiding means;

second movement means, for moving said cutter in a direction which is parallel to said longitudinal length of said guiding means;

wherein said guide supporting member has a lower surface which projects below a lower surface of said guiding means; and wherein said cutter is a belt cutter having a belt wound around a bar, and wherein said guiding means is provided with vibration preventing means for restricting a vibration of the bar.

26. Apparatus as claimed in claim 25, wherein said vibration preventing means has vertical position adjusting means for freely moving the vibration preventing means in a vertical direction and for fixing the vibration preventing means to said guiding means.

* * * * *